(12) United States Patent
Spaulding et al.

(10) Patent No.: US 12,386,925 B2
(45) Date of Patent: Aug. 12, 2025

(54) INTEGRATING SECURE WATERMARKS INTO CONTENT

(71) Applicant: Google LLC, Mountain View, CA (US)

(72) Inventors: Michael James Spaulding, San Francisco, CA (US); Chien Hong Lucas Png, Menlo Park, CA (US)

(73) Assignee: Google LLC, Mountain View, CA (US)

( * ) Notice: Subject to any disclaimer, the term of this patent is extended or adjusted under 35 U.S.C. 154(b) by 179 days.

(21) Appl. No.: 17/767,114

(22) PCT Filed: Nov. 30, 2020

(86) PCT No.: PCT/US2020/062594
§ 371 (c)(1),
(2) Date: Apr. 7, 2022

(87) PCT Pub. No.: WO2022/115111
PCT Pub. Date: Jun. 2, 2022

(65) Prior Publication Data
US 2023/0022018 A1    Jan. 26, 2023

(51) Int. Cl.
*G06F 21/16*    (2013.01)
*H04N 21/8358*    (2011.01)

(52) U.S. Cl.
CPC ......... *G06F 21/16* (2013.01); *H04N 21/8358* (2013.01)

(58) Field of Classification Search
CPC .... H04N 21/835; H04N 21/8358; H04N 1/32; G06F 21/16; G06F 16/7837
See application file for complete search history.

(56) References Cited

U.S. PATENT DOCUMENTS

| 8,037,506 B2 | 10/2011 | Cooper et al. |
| 10,469,882 B2 | 11/2019 | Pathak et al. |
| 10,499,120 B2 | 12/2019 | Winograd et al. |

(Continued)

FOREIGN PATENT DOCUMENTS

| CN | 103929646 | 7/2014 |
| CN | 103955884 | 7/2014 |

(Continued)

OTHER PUBLICATIONS

Notice of Allowance in Japanese Appln. No. 2022-525857, mailed on Nov. 20, 2023, 5 pages (with English translation).

(Continued)

*Primary Examiner* — Jeremy S Duffield
(74) *Attorney, Agent, or Firm* — Fish & Richardson P.C.

(57) ABSTRACT

A method includes receiving, by a content server including one or more processors and from a client device, one or more characteristics of a particular content delivery opportunity, obtaining, by the content server, a watermarked digital component that is stenographed with a watermark representing (i) a payload that triggers an action by a client device that detects the watermark and (ii) a reporting location that is contacted by a client device in response to detecting the watermark, generating, by the content server, combined content by combining the watermarked digital component with content from a source that differs from a source of the digital component, and providing, by the content server and to the client device, the combined content.

17 Claims, 4 Drawing Sheets

(56) References Cited

U.S. PATENT DOCUMENTS

| | | | |
|---|---|---|---|
| 2004/0255123 A1* | 12/2004 | Noyama | H04N 21/8358 382/250 |
| 2007/0162927 A1 | 7/2007 | Ramaswamy et al. | |
| 2008/0228575 A1* | 9/2008 | Silberstein | G06Q 30/0248 705/14.47 |
| 2008/0249961 A1* | 10/2008 | Harkness | H04N 21/44224 707/999.005 |
| 2012/0072731 A1* | 3/2012 | Winograd | H04L 63/102 713/176 |
| 2012/0084802 A1* | 4/2012 | Kitazato | H04H 60/13 725/14 |
| 2012/0124605 A1* | 5/2012 | Praden | H04N 21/25891 725/14 |
| 2013/0145022 A1 | 6/2013 | Srivastava et al. | |
| 2013/0198608 A1 | 8/2013 | Krassner et al. | |
| 2013/0331971 A1* | 12/2013 | Bida | G10L 19/018 700/94 |
| 2013/0347061 A1* | 12/2013 | Qureshi | H04L 63/14 726/1 |
| 2014/0016817 A1* | 1/2014 | Nakagata | G06T 1/005 382/100 |
| 2014/0149395 A1* | 5/2014 | Nakamura | G06F 21/16 707/722 |
| 2014/0177834 A1* | 6/2014 | Hunacek | H04N 21/4353 380/205 |
| 2014/0282695 A1* | 9/2014 | Bakar | G06Q 30/0241 725/32 |
| 2015/0264429 A1* | 9/2015 | Winograd | H04N 21/44204 725/19 |
| 2016/0057490 A1* | 2/2016 | Besehanic | H04N 21/44213 725/19 |
| 2018/0077456 A1* | 3/2018 | Kitahara | H04N 21/8586 |
| 2018/0218392 A1 | 8/2018 | Slain | |
| 2018/0255351 A1 | 9/2018 | Besehanic | |
| 2020/0077159 A1 | 3/2020 | Deshpande | |

FOREIGN PATENT DOCUMENTS

| | | |
|---|---|---|
| CN | 106170988 | 11/2016 |
| JP | 2004-005925 | 1/2004 |
| JP | 2005-184524 | 7/2005 |
| JP | 2017-011503 | 1/2017 |
| JP | 2017-530597 | 10/2017 |
| KR | 10-2006-0039436 | 5/2006 |
| KR | 10-2015-0019813 | 2/2015 |
| KR | 10-2016-0040535 | 4/2016 |

OTHER PUBLICATIONS

International Search Report and Written Opinion in International Appln. No. PCT/US2020/062594, dated Aug. 11, 2021, 14 pages.
Kelash et al., "Hiding data in video sequences using steganography algorithms." 2013 International Conference on ICT Convergence (ICTC). IEEE, Oct. 2013, 6 pages.
Office Action in European Appln. No. 20828621.1, mailed on Oct. 16, 2023, 7 pages.
International Preliminary Report on Patentability in International Appln. No. PCT/US2020/062594, mailed on Jun. 15, 2023, 8 pages.
Office Action in Japanese Appln. No. 2022-525857, dated Jul. 3, 2023, 12 pages (with English translation).
Office Action in Indian Appln. No. 202227021026, mailed on Mar. 28, 2024, 7 pages (with English translation).
Office Action in Korean Appln. No. 10-2022-7013865, mailed on Jun. 10, 2024, 14 pages (with English translation).
Notice of Allowance in Korean Appln. No. 10-2022-7013865, mailed on Nov. 15, 2024, 4 pages (with English translation).
Office Action in Chinese Appln. No. 202080076096.3, mailed on Apr. 7, 2025, 21 pages (with English translation).

* cited by examiner

INTEGRATING SECURE WATERMARKS INTO CONTENT

CROSS-REFERENCE TO RELATED APPLICATIONS

This application is a National Stage Application under 35 U.S.C. § 371 and claims the benefit of International Application No. PCT/US2020/062594, filed Nov. 30, 2020. The disclosure of the foregoing application is hereby incorporated by reference in its entirety.

BACKGROUND

This specification relates to tags that are integrated into content and, upon receipt, cause devices to perform specified actions.

SUMMARY

In general, one innovative aspect of the subject matter described in this specification can be embodied in methods that include receiving, by a content server including one or more processors and from a client device, one or more characteristics of a particular content delivery opportunity, obtaining, by the content server, a watermarked digital component that is stenographed with a watermark representing (i) a payload that triggers an action by a client device that detects the watermark and (ii) a reporting location that is contacted by a client device in response to detecting the watermark, generating, by the content server, combined content by combining the watermarked digital component with content from a source that differs from a source of the digital component, and providing, by the content server and to the client device, the combined content. Other implementations of this aspect include corresponding apparatus, systems, and computer programs, configured to perform the aspects of the methods, encoded on computer storage devices.

These and other implementations can each optionally include one or more of the following features. In some aspects generating combined content includes integrating the watermarked digital component into the content at a specified location within the content.

In some aspects, the content is a video stream and integrating the watermarked digital component into the content comprises splicing the watermarked digital component into the video stream at the specified location, which is a playback location.

In some aspects, integrating the watermarked digital component into the content comprises integrating the watermarked digital component into one of: streaming audio, streaming video, gaming content or an image.

In some aspects, the destination location is a uniform resource locator (URL) that is contacted by the client device in response to the client device detecting the watermark, and at least a portion of the payload data is transmitted to the URL in response to the client device detecting the watermark.

In some aspects, a given portion of the payload is cryptographically signed and the given portion of the payload that is cryptographically signed is transmitted with data causing the display of the watermarked digital component to the URL.

In some aspects, the content server is configured to remove embedded scripts from received digital components and the watermark has a form that prevents the watermark from being removed from the watermarked digital component by the content server.

In a networked environment such as the Internet, first-party content providers can deliver information for presentation in electronic documents such as web pages or application interfaces. The documents can include content provided by first-party content providers and third-party content providers.

Third-party content can be added to an electronic document using various techniques. Some documents include tags that instruct a client computer at which the document is presented to request third-party content items directly from third-party content providers. Other documents include tags that instruct the client computer to call an intermediary service that partners with multiple third-party content providers. In some instances, third-party content items are dynamically selected for presentation in electronic documents, and the particular third-party content items selected for a given serving of a document may differ from third-party content items selected for other servings of the same document. The tags can also instruct the client computer to perform actions such as measuring particular metrics.

Such tags can be used to measure, for example, whether the content was delivered, whether the content was visible, and how long the content was visible for, among other factors. This information can be valuable to content providers to improve their content and to improve user experience. Additionally, this information can be used to improve the efficiency of the system by allowing content providers to refrain from presenting content to users who are not likely to be interested in the content, reducing the transmission of data over the network and associated infrastructure overhead.

In some instances, these measurements can be performed by the system that publishes, delivers, or distributes the content, and content providers rely on this measurement data to improve the user experience for users of a receiving client computer. However, when the content publisher performs these measurements, they can be less accurate, less consistent, and less reliable while giving the appearance of providing fully tracked and measured content delivery. Furthermore, some content publishers do not perform measurements or collect information or signals from receiving client computers at all, and cannot guarantee or even determine whether the user of the client computer has consumed the content or engaged the content at all once it is delivered. Without these signals, content providers and content-providing platforms will miss out on valuable information such as viewability, audibility, and validity of traffic, among other metrics, which affect content distribution decisions, including whether and what a content provider distributes to a client computer.

In some instances, when the tags are provided to content publishers to be delivered with the content, the tags may not be delivered, or may be removed before the content is provided to the client computers. Indeed, some methods for measuring information can be rendered inoperable if the tags are not delivered with the content to the end user of the client computer.

The following description discusses various techniques and systems for improving the accuracy and reliability of the measurements requested by content providers. Because measurement techniques currently require the cooperation of the content publishing system, content providers are limited to only the measurements that are performed by the publishing system, and these measurements may not be accurate enough or useful for the content provider's purposes. By including watermarks that cause a receiving client computer to perform specified measurements that the client computer is configured to perform, the proposed system allows content providers to request particular data that is tailored to their needs and can reduce the amount of data collected and transmitted.

In addition, the use of these measurement signals to identify and select additional digital content can prevent distribution of inappropriate or unwanted content, thereby reducing wasted resources. This method reduces the amount of resources expended distributing content that is unlikely to be viewed or wanted and should not be distributed and more efficiently provide content across a network—the method prevents the distribution of content to an entity that is not actually consuming (listening to and/or viewing) the content. In other words, the computing resources, such as network bandwidth, processor cycles, and/or allocated memory, are not wasted by using these resources to distribute content that should not be distributed.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Metrics for the process of selecting and delivering digital components and content can be obtained through the inclusion of tags to be delivered with the digital components and content. When a publisher or supply-side platform (SSP) issues a server-side request for a digital component, the platform is required to pass certain client header fields that indicate, for example, selection criteria, for the purposes of ensuring that systems participating in the content selection process satisfy distribution parameters and limit defined by participating content providers and content publishers. The exchange or exchanges participating each return a set of one or more selection criteria for candidate digital components, from which the SSP selects one and sends a selection notification to the exchange. The exchange then provides the selection notification to the content provider, at which point the content provider returns a link to their digital component, stored on their digital component server. The SSP can then provide the digital component and the requested content to the client device.

However, this method of measuring signals and characteristics important for content providers to improve their offerings and the user's experience relies on a content distribution system to dependably forward the tags selected and provided by the content provider. In some instances, if the tags are not forwarded to the end user along with the digital components and content, only the metrics collected by the content publisher will be provided to the content creator or provider. This can lead to irrelevant, or in some instances, no data being provided to the content creator as feedback. In a system that relies on the content publisher to perform measurements and collect data, the type and amount of feedback available to a content creator is entirely dependent on the content publisher.

The systems and methods described below provide an opportunity to content creators to pass instructions directly to the client in a manner that will not cause a publisher-side server to remove the instructions, be somewhat resilient to interference by the publisher-side server or other intermediary, and allow a media player running on the client device to recognize and take action as instructed. Indeed, while content publishers and publisher-side servers are able to execute, strip, or otherwise modify instructions that are included in addition to a digital component that is provided for presentation with requested digital content, they must preserve the integrity of the digital component itself.

Throughout this document, a user (such as an end user, content generator, or content provider, among other types of users) may be provided with controls allowing the user to make an election as to both if and when systems, programs, or features described herein may enable collection of user information (e.g., information about a user's social network, social actions, or activities, profession, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

Figure 1:
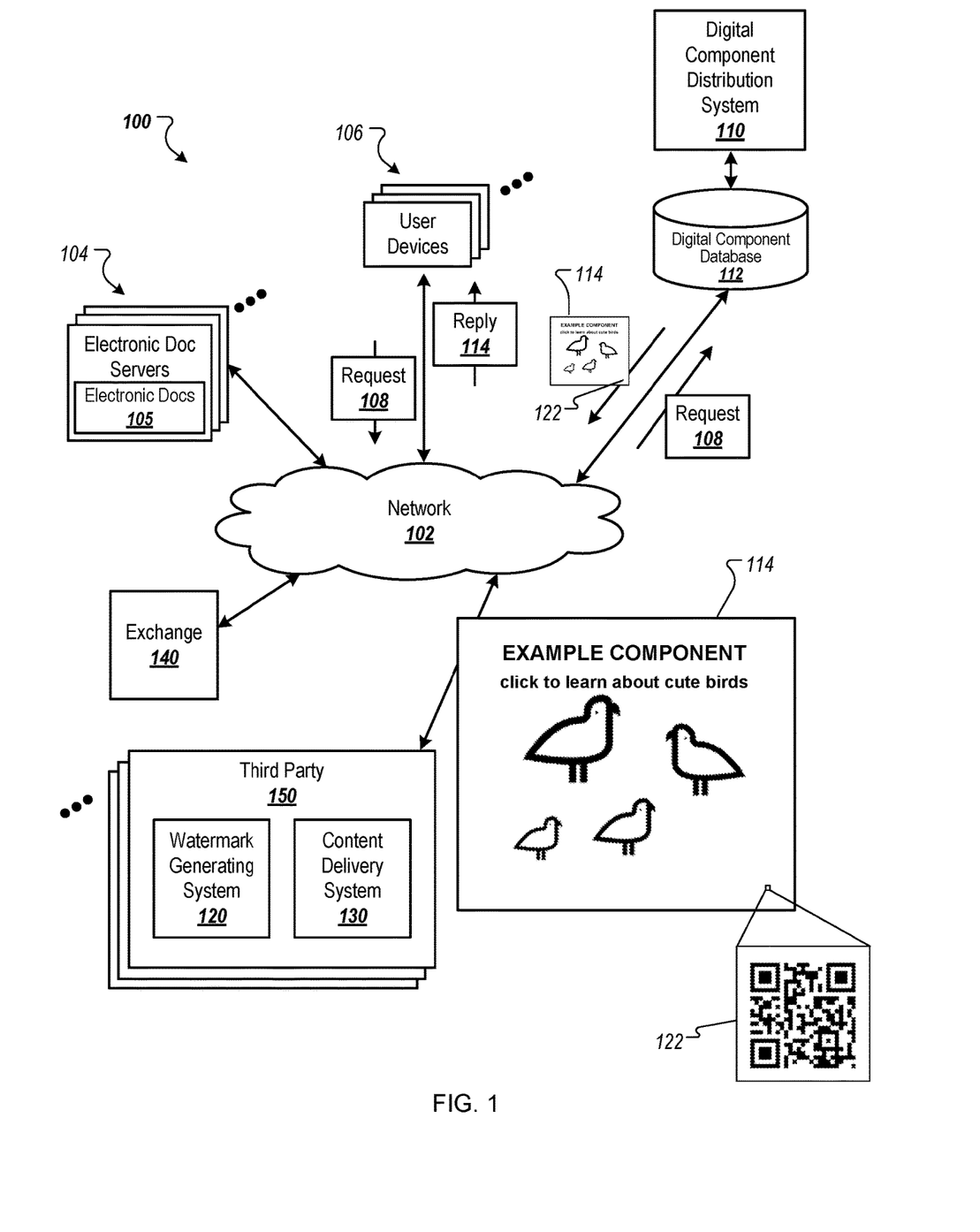
FIG. 1 is a block diagram of an example environment for improved data integrity by integrating image watermarks into content delivered to user devices.

FIG. 1 is a block diagram of an example environment 100 for improved data integrity by integrating image watermarks into content delivered to user devices. The example environment 100 includes a network 102, such as a local area network (LAN), a wide area network (WAN), the Internet, or a combination thereof. The network 102 connects electronic document servers 104 ("Electronic Doc Servers"), user devices 106, a digital component distribution system 110 (also referred to as DCDS 110), an exchange 140, and third parties 150. The example environment 100 may include many different electronic document servers 104, user devices 106, exchanges 140, and third parties 150.

A user device 106 is an electronic device that is capable of requesting and receiving resources (e.g., electronic documents) over the network 102. Example user devices 106 include personal computers, wearable devices, smart speakers, tablet devices, mobile communication devices (e.g., smart phones), smart appliances, and other devices that can send and receive data over the network 102. In some implementations, the user device can include a speaker that outputs audible information to a user, and a microphone that accepts audible input (e.g., spoken word input) from the user. The user device can also include a digital assistant that provides an interactive voice interface for submitting input and/or receiving output provided responsive to the input. The user device can also include a display to present visual information (e.g., text, images, and/or video). A user device 106 typically includes a user application, such as a web browser, to facilitate the sending and receiving of data over the network 102, but native applications executed by the user device 106 can also facilitate the sending and receiving of data over the network 102.

User device 106 includes software such as a browser or an operating system. In some implementations, the software allows a user to access information through a network, such as network 102, retrieving information from a server and displaying the information on a display of user device 106. In some implementations, the software manages user device 106's hardware and software resources and provides common services for other programs on user device 106. The software can act as an intermediary between programs and user device 106's hardware.

An electronic document is data that presents a set of content at a user device 106. Examples of electronic documents include webpages, word processing documents, portable document format (PDF) documents, images, videos, search results pages, and feed sources. Native applications (e.g., "apps"), such as applications installed on mobile, tablet, or desktop computing devices are also examples of electronic documents. Electronic documents 105 ("Electronic Docs") can be provided to user devices 106 by electronic document servers 104. For example, the electronic document servers 104 can include servers that host publisher websites. In this example, the user device 106 can initiate a request for a given publisher webpage, and the electronic document server 104 that hosts the given publisher webpage can respond to the request by sending machine Hyper-Text Markup Language (HTML) code that initiates presentation of the given webpage at the user device 106.

Electronic documents can include a variety of content. For example, an electronic document 105 can include static content (e.g., text or other specified content) that is within the electronic document itself and/or does not change over time. Electronic documents can also include dynamic content that may change over time or on a per-request basis. For example, a publisher of a given electronic document can maintain a data source that is used to populate portions of the electronic document. In this example, the given electronic document can include a tag or script that causes the user device 106 to request content from the data source when the given electronic document is processed (e.g., rendered or executed) by a user device 106. The user device 106 integrates the content obtained from the data source into a presentation of the given electronic document to create a composite electronic document including the content obtained from the data source. Media content as referred to herein is a type of digital content.

In some situations, a given electronic document can include a digital content tag or digital content script that references the DCDS 110. In these situations, the digital content tag or digital content script is executed by the user device 106 when the given electronic document is processed by the user device 106. Execution of the digital content tag or digital content script configures the user device 106 to generate a request 108 for digital content, which is transmitted over the network 102 to the DCDS 110. For example, the digital content tag or digital content script can enable the user device 106 to generate packetized data request including a header and payload data. The request 108 can include data such as a name (or network location) of a server from which the digital content is being requested, a name (or network location) of the requesting device (e.g., the user device 106), and/or information that the DCDS 110 can use to select digital content provided in response to the request. The request 108 is transmitted, by the user device 106, over the network 102 (e.g., a telecommunications network) to a server of the DCDS 110.

The request 108 can include data that specifies the electronic document and characteristics of locations at which digital content can be presented. For example, data that specifies a reference (e.g., URL) to an electronic document (e.g., webpage) in which the digital content will be presented, available locations (e.g., digital content slots) of the electronic documents that are available to present digital content, sizes of the available locations, positions of the available locations within an instance of the electronic document, and/or media types that are eligible for provision in the locations can be provided to the DCDS 110. Similarly, data that specifies keywords designated for the selection of the electronic document ("document keywords") or entities (e.g., people, places, or things) that are referenced by the electronic document can also be included in the request 108 (e.g., as payload data) and provided to the DCDS 110 to facilitate identification of digital content items that are eligible for presentation with the electronic document.

Requests 108 can also include data related to other information, such as information that the user has provided, geographic information that indicates a state or region from which the request was submitted, or other information that provides context for the environment in which the digital content will be displayed (e.g., a type of device at which the digital content will be displayed, such as a mobile device or tablet device). User-provided information can include demographic data for a user of the user device 106. For example, demographic information can include age, gender, geographical location, education level, marital status, household income, occupation, hobbies, social media data, and whether the user owns a particular item, among other characteristics.

Data that specifies characteristics of the user device 106 can also be provided in the request 108, such as information that identifies a model of the user device 106, a configuration of the user device 106, or a size (e.g., physical size or resolution) of an electronic display (e.g., touchscreen or desktop monitor) on which the electronic document is presented. Requests 108 can be transmitted, for example, over a packetized network, and the requests 108 themselves can be formatted as packetized data having a header and payload data. The header can specify a destination of the packet and the payload data can include any of the information discussed above.

The DCDS 110 selects digital content that will be provided for presentation with the given electronic document in response to receiving the request 108 and/or using information included in the request 108. In some implementations, the DCDS 110 is implemented in a distributed computing system (or environment) that includes, for example, a server and a set of multiple computing devices that are interconnected and identify and distribute digital content in response to requests 108. The set of multiple computing devices operate together to identify a set of digital content that is eligible to be presented in the electronic document from among a corpus of millions or more of available digital content. The millions or more of available digital content can be indexed, for example, in a digital component database 112. Each digital content index entry can reference the corresponding digital content and/or include distribution parameters (e.g., selection criteria) that condition the distribution of the corresponding digital content.

The identification of the eligible digital content can be segmented into multiple tasks that are then assigned among computing devices within the set of multiple computing devices. For example, different computing devices can each analyze a different portion of the digital component database 112 to identify various digital content having distribution parameters that match information included in the request 108.

Digital content to be selected and distributed by the DCDS 110 is provided by third parties 150. Third parties 150 can be, for example, content providers that create the digital components. In some implementations, third parties 150 are content providers that curate digital components. Third parties 150 can provide candidate digital components, along with certain selection criteria such as a bid amount, a set of keywords to which the digital component is responsive, a threshold delivery rate of the digital component once selected, a threshold amount of user engagement with the digital component once delivered to an end user, and a threshold amount of a specific type of user engagement with the digital component once delivered to an end user, among other types of selection criteria.

A user device 106 typically includes applications, such as web browsers and/or native applications, to facilitate the sending and receiving of data over the network 102. A native application is an application developed for a particular platform or a particular device (e.g., mobile devices having a particular operating system). Publishers can develop and provide, e.g., make available for download, native applications to the user devices 106. A web browser can request a resource 105 from a web server that hosts a website of a publisher, e.g., in response to the user of the user device 106 entering the resource address for the resource in an address bar of the web browser or selecting a link that references the resource address. Similarly, a native application can request application content from a remote server of a publisher. Some publishers use an SSP to manage the process of obtaining digital components for digital component slots of its resources and/or applications. An SSP is a technology platform implemented in hardware and/or software that automates the process of obtaining digital components for the resources and/or applications. An SSP can interact with one or more demand side platforms ("DSPs") to obtain information, such as selection criteria, that can be used to select a digital component for a digital component slot. In some implementations, each publisher can have a corresponding SSP or multiple SSPs. Some publishers may use the same SSP.

In some implementations DCDS 110 can perform the actions of either or both of the SSP and DSP. In this particular example, DCDS 110 performs the actions of an SSP by interacting with the content publisher and delivering content to the client device 106.

System 100 also includes one or more exchanges 140. Exchange 140 is a digital platform that enables the offering and selection of digital components for presentation with requested digital content. Digital component providers, such as third parties 150, can create (or otherwise publish) digital components that are presented in digital component slots of publisher's resources and applications. The digital component providers 150 can use a DSP to manage the provisioning of its digital components for presentation in digital component slots. A DSP is a technology platform implemented in hardware and/or software that automates the process of distributing digital components for presentation with the resources and/or applications. A DSP can interact with multiple exchanges on behalf of digital component providers 150 to provide digital components for presentation with the resources and/or applications of multiple different publishers. In general, a DSP can receive requests for digital components (e.g., from an SSP directly or by way of an exchange), generate (or select) a selection parameter for one or more digital components created by one or more digital component providers based on the request, and provide data related to the digital component (e.g., the digital component itself) and the selection parameter to an SSP.

The DCDS 110 aggregates the results received from the set of multiple computing devices and uses information associated with the aggregated results to select one or more instances of digital content that will be provided in response to the request 108. In turn, the DCDS 110 can generate and transmit, over the network 102, reply data 114 (e.g., digital data representing a reply) that enables the user device 106 to integrate the select set of digital content into the given electronic document, such that the selected set of digital content and the content of the electronic document are presented together at a display of the user device 106.

Third parties 150 can each include a watermark generating system 120 and a content delivery system 130.

Watermark generating system 120 generates a watermark to be integrated into content provided to an end user. Watermark generating system 120 generates the watermark based on indicators provided by the content distribution system and/or content provider of metrics that the content distribution system and/or content provider. For example, watermark system 120 can receive data from the content providers that indicate metrics including an amount of time that the digital component was actively being viewed upon delivery to the end user to determine what kind of metrics should be collected. Watermark generating system 120 is configured to generate images from input data. In particular, watermark generating system includes an encoding input generator and a watermark generator.

The encoding input generator processes a plaintext data item to generate an encoding image that encodes the plaintext data item. The plaintext data item can be any data that is capable of being encoded within the constraints of the encoding input generator. For example, the plaintext data item may be a text sample or string with a maximum length of n characters, since the size of the encoding image may be capable of providing lossless encoding for text samples only up to the pre-defined maximum length of n characters. In some implementations, the plaintext data item includes a session identifier that uniquely identifies a network session between the client computer 106 and a content server during which a response is served to a request from the client computer 106.

In some implementations, the plaintext data item includes or references source content data that identifies the particular source content served to the client computer 106 or information associated with the source content (e.g., information that indicates which of the source content providers provided the particular source content served to the client computer 106 and a timestamp indicating when the source image was served or requested). In some implementations, a database stores data that correlates such information about source content or a response served for a particular request, in order to make the detailed information accessible via the session identifier or other information represented by the plaintext data item. The response records database can also associate a session identifier with source content data, thereby making the source content data accessible by querying the database using the session identifier represented by the plaintext data item. A user can then identify, for example, which of the source content items was served to the client computer at what time and from which source content provider for using the session identifier from the plaintext data item. The source content can be in the form of visual data, audio data, or a combination. For example, the source content can be plaintext data, image data, video data, and/or audio data, among other types of content. For simplicity, the discussion that follows is generally directed to image data. However, application of the system as described to other types of data is contemplated, and some example implementations are described.

The plaintext data can include information, described in further detail below, that causes a client device to perform one or more specified measurements when run by the client device. For example, the plaintext data can include measurement scripts that cause a client device to perform a measurement of the amount of time that content or a digital component is viewed by the client device and the type of interactions performed by the user of the client device with the content or the digital component.

The encoding image is an image that encodes the plaintext data item. In some implementations, the encoding image is a matrix-type barcode that represents the plaintext data item. One example of a suitable matrix-type barcode is a Quick Response Code (QR code). The encoding image can have a pre-defined size in terms of a number of rows and columns of pixels. Each pixel in the encoding image can encode a binary bit of data, where the value of each bit is represented by a different color. For example, a pixel that encodes the binary value '1' may be black while a pixel that encodes the binary value '0' may be white. In some implementations, the smallest encoding unit of an encoding image may actually be larger than a single pixel. But for purposes of the examples described herein, the smallest encoding unit is assumed to be a single pixel. It should be appreciated, however, that the techniques described herein may be extended to implementations where the smallest encoding unit is a set of multiple pixels, e.g., a 2×2 or 3×3 set of pixels.

The watermark generating system 120 further includes a watermarking image generator. The watermarking image generator is configured to process the encoding image to generate a semi-transparent watermarking image. The semi-transparent watermarking image is derived from the encoding image and also encodes the plaintext data item. However, the transparencies, colors, arrangement of encoded pixels and/or other features of the watermarking image may be changed from the transparencies, colors, arrangement of encoded pixels and/or other features of the encoding image. For example, whereas the encoding image may be uniformly opaque and consist of encoded pixels that are closely packed adjacent to each other, the watermarking image may include some fully transparent pixels and some partially transparent pixels. Moreover, the encoded pixels in the watermarking image may be spaced relative to each other so that each encoded pixel is surrounded by non-encoded pixels (i.e., "blank" pixels). The transformation of the encoding image to the watermarking image may be performed so that, after the watermarking image is overlaid and merged on a background source image, the encoded information may be decoded, e.g., by reconstructing the encoding image or the watermarking image. In some implementations, the watermarking image is not visible to a user of a client device that receives the watermarking image. For example, the watermarking image may be so small in proportion to a digital component or content that the watermarking image is provided with that a human user would not see it.

Content delivery system 130 performs content packaging and delivery. For example, content delivery system 130 can format content, combine media content, and deliver content to a user device. Content delivery system 130 can, for example, detect digital content slots in which digital content is expected to be delivered within media content being delivered to a user device, such as user device 106. Content delivery system 130 can also format content to include digital components selected for delivery. For example, content delivery system 130 can combine digital components and content before delivering the content to a user device. Content delivery system 130 can also format digital components to include watermark images. For example, content delivery system 130 can integrate a watermarking image 122 such as a partially transparent QR code that is not visible to a user into a digital component to be delivered as a reply 114 with requested content to a user device. In some implementations, a digital content slot is indicated by a marker or other flag that indicates to content delivery system 130 that additional digital content should be provided. These markers can be defined by the media content provider and/or creator. In some implementations, content delivery system 130 can determine locations at which these markers should be placed within the media content. For example, content delivery system 130 can detect naturally blank or unobtrusive locations within an image file and place markers for a watermark image or for additional digital content to be provided.

In some implementations, content delivery system 130 can provide the additional digital content within the stream of media content within the defined slots. For example, in some implementations, content delivery system 130 can insert a pause that serves as a defined slot within the audio file at the marker in which additional content can be integrated.

In some implementations, content delivery system 130 can pause the delivery of the stream of media content when a marker is detected, separately deliver additional digital content, and then resume delivery of the media content.

In some implementations, the watermarking image may be generated directly from the plaintext data without explicitly generating the encoding image as an intermediate operation on the way to achieving watermark image. Moreover, for implementations where the third party 150 employs a source image encoder to directly merge the watermarking image over top of the source image for service of the merged image to the client computer 106, the third party 150 may directly encode the watermark in the source image without explicitly generating the encoding image, watermarking image, or both. It will be apparent to persons of skill in the art how one or more of these operations could be consolidated to provide a more direct form of encoding/watermarking of source image.

Figure 2:
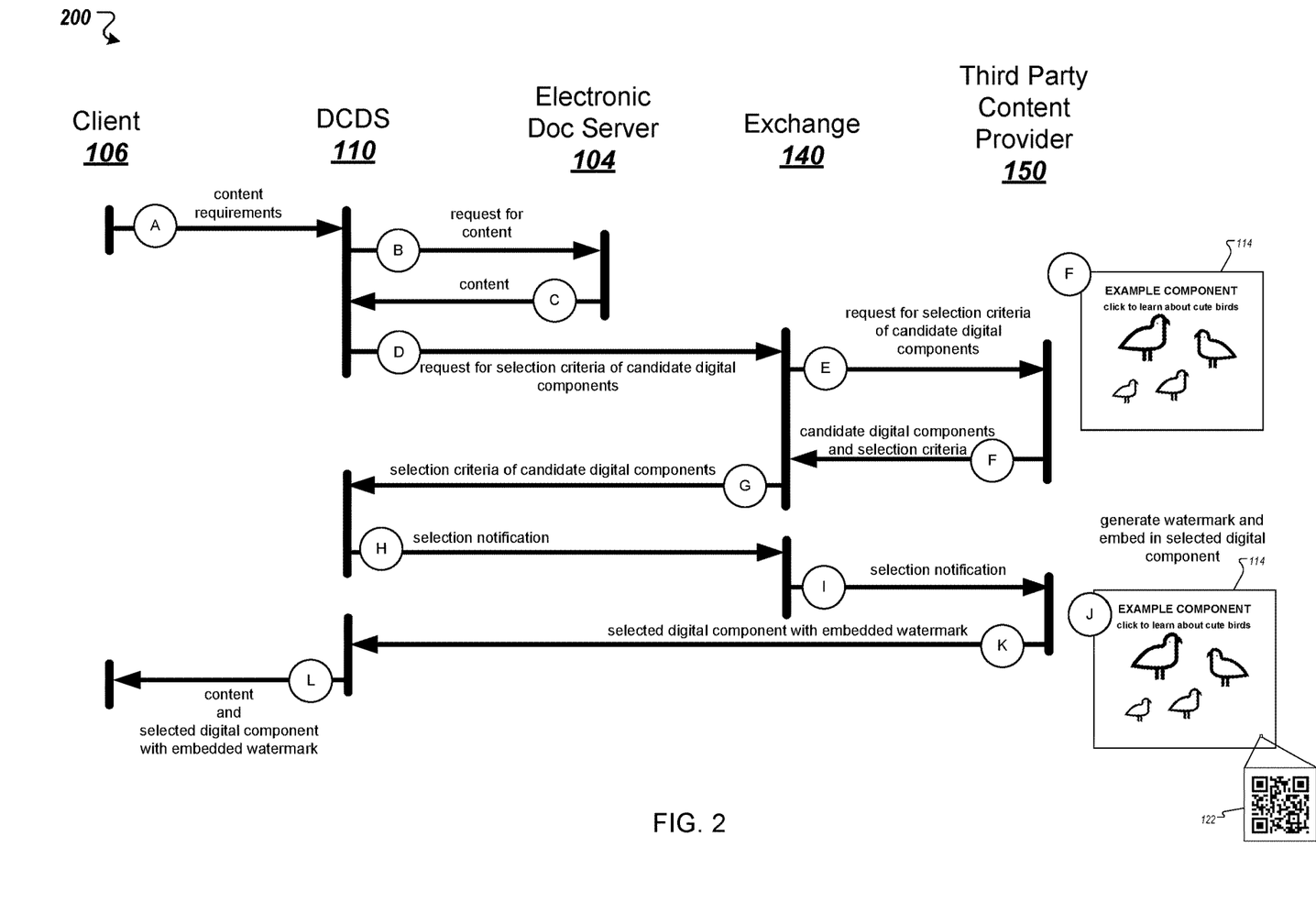
FIG. 2 depicts a data flow of improving data integrity through integrating image watermarks into content.

FIG. 2 depicts a data flow 200 of a method for improving data integrity through integrating image watermarks into content in the example environment of FIG. 1. Operations of data flow 200 are performed by various components of the system 100. For example, operations of data flow 200 can be performed by third party content provider 150 in communication with DCDS 110 and client device 106.

The flow begins with step A, in which a client device provides content requirements to a publisher-side server, or SSP. For example, a client device 106 can provide content requirements to DCDS 110, which performs the functions of an SSP. The content requirements can include information about the capabilities of client device 106, characteristics of the connection over which client 106 is accessing a network such as network 102, the location of the content requested, the type of content requested, and information about the current and/or historical activity of user of client device 106, among other information. For example, the content requirements can include information about the available bandwidth over the connection between the client device 106 and the network 102.

In some implementations, the content requirements include one or more characteristics of a content item presentation opportunity. For example, the content requirements can include receiving a request for a digital component to be presented with the requested content. In some implementations, the content requirements simply include information that indicates that certain content is going to be delivered to a user.

The flow continues with step B, in which the SSP sends a request for content to a content provider. For example, DCDS 110 can send a request for a particular webpage to electronic doc server 104. Electronic doc server 104 can be a content publisher, for example, that hosts a particular website or domain and publishes various content. The requested content can be image content, video content, audio content, or text content, among other types of content, and can be stored within electronic doc server 104 or generated upon requested. For example, the requested content can be a video that is hosted by electronic doc server 104.

The flow continues in step C, in which the content repository provides the requested content to the SSP. For example, electronic doc server 104 can transmit the requested webpage to DCDS 110. Electronic doc server 104 can provide the requested content itself to DCDS 110. For example, electronic doc server 104 can provide a video file to DCDS 110. In some implementations, electronic doc server 104 provides the location of the requested content to DCDS 110. For example, electronic doc server 104 can return the location at which the requested video file is stored to DCDS 110.

The flow continues in step D, in which the SSP transmits a request for selection criteria of candidate digital components to an exchange. The request for selection criteria can include information about the capabilities of client device 106, characteristics of the connection over which client 106 is accessing a network such as network 102, characteristics of the content that was requested from electronic doc server 104, and information about the current and/or historical activity of user of client device 106, among other information. For example, the content requirements can include information about the website from which the user was directed to the content that was requested from electronic doc server 104.

In one example, the SSP is implemented as DCDS 110 and can provide a request for selection criteria of one or more candidate digital components to the exchange, implemented as exchange 140. Exchange 140 gathers and manages selection criteria for one or more candidate digital components that can be selected for presentation with requested content. Exchange 140 receives selection criteria and candidate digital components from one or more third party content providers, such as third party content provider 150. Exchange 140 can provide all candidate digital components and the selection criteria for the digital components to DCDS 110 in response to the request for selection criteria of candidate digital components. In some implementations, exchange 140 can perform a preliminary selection process to select one or more digital components from among a number of candidate digital components to provide to DCDS 110. DCDS 110 can solicit selection criteria for candidate digital components to one or more exchanges 140.

The flow continues in step E, in which the exchange provides a request for selection criteria of candidate digital components to a content creator. For example, exchange 140 can solicit candidate digital components from third party content provider 150. The request provided by exchange 140 can include the same information as the request provided by DCDS 110. In some implementations, the request provided by exchange 140 can include more information or restrictions. Exchange 140 can request candidate digital components from one or more third party content providers 150.

The flow continues in step F, in which the third party content provider returns one or more selection criteria to the exchange. For example, the third party content provider 150 can provide one or more selection criteria for candidate digital components to exchange 140. In this particular example, third party content provider 150 provides selection criteria of candidate digital component 114, which is an image that allows a user to click on it to learn about cute birds. In some implementations, two or more third party content providers 150 are in communication with exchange 140 and can each return one or more candidate digital components and their selection criteria to exchange 140.

In some implementations, third party content provider 150 provides candidate digital components and selection criteria of the candidate digital components to exchange 140 in advance of a request for candidate digital components. Exchange 140 can perform a preliminary selection process to reduce the number of candidate digital components and selection criteria for the candidate digital components that are transmitted to DCDS 110. For example, exchange 140 may determine or may be provided with a threshold number of candidate digital components to provide. In some implementations, exchange 140 may perform a preliminary selection process according to particular requirements for selection criteria of the candidate digital components. For example, exchange 140 may receive a threshold value for one or more selection criteria of the candidate digital components from DCDS 110 and then select only those candidate digital components that have selection criteria that meet the threshold value.

The flow continues in step G in which the exchange provides one or more selection criteria of candidate digital components to the SSP for a final selection process. For example, exchange 140 can return one or more selection criteria of candidate digital components to the DCDS 110. The DCDS 110 can be in communication with and receive selection criteria from one or more exchanges 140.

The DCDS 110 can perform a final selection process using the selection criteria of candidate digital components received from exchange 140 according to content selection techniques. For example, the DCDS 110 can perform a content auction using the selection criteria of candidate digital components received from exchange 140 and select a winning digital component for presentation with the requested webpage provided by electronic doc server 104 based on the selection criteria of the winning digital component.

The flow continues in step H, in which the SSP provides a selection notification to the exchange. For example, DCDS 110 can provide a selection notification to exchange 140. The selection notification can identify the digital component that was selected as the winning digital component and/or the selection criteria of the digital component. For example, the selection notification can include an identifier for the digital component.

The flow continues in step I, in which the exchange provides a selection notification to the third party content provider of the selected digital component. For example, exchange 140 can provide a selection notification to third party content provider 150 that provided the selection criteria of the candidate digital component that was selected as the winning digital component. Exchange 140 can generate a selection notification to be provided to third party content provider 150 based on the selection notification received from DCDS 110. In some implementations, exchange 140 simply forwards the selection notification to third party content provider 150 of the selected digital component. In this particular example, the selected digital component can be an image 114 that allows a user to interact with the image itself to learn about cute birds.

Because the selection notification is provided to the third party content provider 150 once the candidate digital component is selected to be presented, the system provides third party content provider 150 with an opportunity to generate a watermark and embed the watermark into the digital component to be secure from interference. Scripts and data embedded within the watermark can, for example, cause the client device to perform measurement actions such as sending a ping to the content provider of the digital component to allow the content provider to compare the communication with the expected interaction data to improve their content, detect fraud, and improve user experience, among other functions.

The flow continues in step J, in which the third party content provider generates the watermark and embeds the watermark in the selected digital component. For example, third party content provider 150 can generate, using watermark generating system 120, a watermarking image, such as watermarking image 122. In this particular example, the watermarking image 122 is a QR code. Watermarking image 122 includes a URL destination and a payload. The URL destination indicates a location to where the payload is to be transmitted when the watermarking image 122 is detected and/or read. The watermarking image 122 is not visible to humans. For example, the watermarking image 122 may be transparent or too small to be visible to the human eye. Because the watermarking image 122 is not visible to humans, it does not affect the user's experience when consuming the requested content.

Embedding, or stenographing, the watermarking image into the digital component can include, for example, integrating the watermarking image into the digital component such that it is not detectable as separate from the digital component. For example, the watermarking image can be embedded into the digital component by overlaying the watermarking image as an additional layer to the digital component image and then flattening the layers so that they are a single entity. In some implementations, the watermarking image can be embedded into the digital component simply by adding it as an additional layer without making the layers indistinguishable.

Although the watermarking image 122 is not visible to humans, an application that displays the digital component into which the watermarking image 122 is embedded can detect the presence of the watermarking image 122 and read the watermarking image 122 that causes the client device 106 to perform specified actions. For example, when a client device downloads requested content along with the digital component with the embedded watermark and then views or otherwise consumes the digital component, the application in which the client device is consuming the digital component can detect the watermarking image. The application will then read the watermarking image, and the instructions encoded within the watermarking image will be executed by the client device. Because the watermarking image is embedded within the digital component, in some implementations, the application will only be able to detect the watermarking image if the digital component is downloaded and consumed, providing an additional layer of security. In some implementations, digital component 114 can be marked or flagged such that the application on the client device 106 is watching for signatures or tags such as watermarking image 122. For example, digital component 114 can be flagged to indicate the presence of watermarking image 122, the location of watermarking image 122, and/or the format of watermarking image 122. In some implementations, the application is configured to scan digital components received for the presence of watermarking images. For example, a video player on client device 106 can be configured to scan videos for watermarks, in either video or audio form.

Watermarking image 122 can cause client device 106 to provide a receipt to the destination indicated by the URL that a user of client device 106 has received and consumed the digital component.

The payload of watermarking image 122 can simply be a payload to be forwarded to the URL destination. In some implementations, the payload includes measurement scripts that cause client device 106 to perform actions specified by the scripts, including performing a measurement action, pinging a specified device or location, and transmitting a measurement to a specified device or location, among other actions.

In some implementations, the watermarking image 122 payload and location within the digital component can be customized to replace or reduce the number of additional measurement scripts that were previously provided separately from the digital component and therefore vulnerable to being removed or tampered with.

In some implementations, the watermarking image 122 can be made tamper-resistant by embedding cryptographically signed metadata that ties the watermarking image 122 to specific header fields that must be forwarded by the SSP, such as DCDS 110. By including the cryptographically signed metadata, a content provider such as third party content provider 150 can verify that the client device 106 that is returning the payload to the third party content provider 150 matches the selection criteria and other characteristics of the presentation opportunity as provided or indicated by the request for content.

The flow continues in step K, in which the third party content provider provides the selected digital component with the embedded watermark to the SSP. For example, third party content provider 150 can transmit digital component 114 with the embedded watermarking image 122 that is not visible to humans to DCDS 110.

The flow continues in step L, in which the SSP provides the content and the digital component with the embedded watermark to the client device. For example, DCDS 110 can provide the requested webpage and digital component 114 with the embedded watermarking image 122 to client device 106 to be presented to the user.

In some implementations, the SSP combines the digital component (and therefore the watermarking image) into the requested content prior to transmitting the content to the client device. In other implementations, the SSP can provide the digital component (and therefore the watermarking image) and the requested content to the client device separately. In either type of implementation, the integrity of the measurement information contained within the watermarking image is preserved.

Although the description of the system is done with respect to image content data for ease of explanation, the system is contemplated for use with any type of content. For example, in some implementations, the requested content can be a streaming video. The watermarking image can be embedded within each frame of the video, embedded as an overlay or transparent layer over the video, or embedded within specific frames of the video, among other placements. For example, the requested content can be a video game that is played online in real-time with other players. The watermarking image can be embedded within two or more specific frames within the video. In some implementations, the requested content can be streaming audio, and the watermarking image can be provided, for example, as metadata or as audio data that is inaudible to humans, but detectable by the application on which the content is played at the client device.

The secure watermarking system provides a number of advantages. In traditional systems, the data that is collected is measured and distributed at the whim of an SSP, which executes measurement scripts and performs related measurement actions on behalf of the client device. However, traditional methods may not be reliable for the data that a content provider would like to use to improve its digital components and the user experience. By allowing metrics specified by a particular content creator or developer to be collected, the secure watermarking system allows content providers to improve their content and to better address user needs. Additionally, combining the digital component with the requested content allows the system to be easily scalable to many environments because content providers will not need to develop unique content specifically formatted for each environment.

The system also reduces the amount of traffic across a network, such as network 102, because the system allows for content providers to control the measurement actions being taken and type and amount of data being collected. Instead of waiting for content publishers to provide data that may not be useful to the improvement of a content provider's digital components or the user's experience, the content provider has control over how and what measurements are taken.

In some implementations, the system protects content providers by allowing the encrypting of payloads within the watermarking image. For example, a content provider can encrypt a payload such that only the content provider can decrypt it. When a client device downloads requested content along with the digital component with the embedded watermark and then views or otherwise consumes the digital component, the application in which the client device is consuming the digital component will detect the watermarking image. The application will then read the watermarking image, and the instructions encoded within the watermarking image will be executed by the client device. In this particular example, the client device can simply forward the encrypted payload to the URL destination, which is accessible to the content provider without decrypting the payload or performing any operations with the payload. The content provider can then decrypt the payload to verify that no changes have occurred, and that the client device that returned the payload is the client device to which the payload was sent.

The described system removes the intermediate step of a content provider relying on the SSP to provide and execute the measurement scripts. The system is therefore more efficient and provides better and more accurate measurements than traditional methods of collecting and measuring data regarding the delivery and consumption of digital components.

The system also simplifies and reduces the workload at the SSP level, because the SSP is no longer responsible for forwarding and executing measurement instructions provided by the content provider. Additionally, the system provides a consolidation of the measurement process that simplifies the workflow and reduces the workload at the client device and traffic over the network by reducing the number of irrelevant measurement actions that the client device is instructed to take and by allowing the client to transmit measurement results or provide pings directly to the content provider instead of through the SSP or other intermediary.

Furthermore, the watermarking image allows for more accurate, and more granular measurements to be taken. For example, a content provider can embed a watermark at the beginning of a video and at the end of the video to determine whether the entire video was consumed. Because the watermarks were embedded within the video, the video must be played by the application at the client device in order for the watermarks to be detectable and for the client device to execute a measurement action or respond by forwarding a payload.

In another example, a content provider can embed more than one watermark within a digital component. For example, a content provider can embed watermarks in various locations within a digital component to ensure that specific portions of the digital component were visible.

The system prevents interference or invalid actions taken by intermediaries, including content publishers, and provides a more secure method of measurement. For example, the system allows for the delivery of measurement instructions directly from a content provider to a client device because the measurement script is provided by the content provider and embedded in the digital component in a manner that cannot be, will not need to be, stripped out by the content publisher or SSP. Indeed, by allowing a content provider to control the placement and format of the embedded watermark, the system provides increased security of the watermark because an SSP will not alter a digital component itself, and in the event that an SSP attempts to alter the digital component, it will not know where the watermark is or what format it is in. Traditional methods relied on SSPs refraining from removing measurement scripts or faithfully executing and forwarding the measurement scripts to a client device, and allowed for the possibility of an SSP preventing the ability to detect whether and how a digital component was presented at a client device. The described method solves this problem by triggering action by the client device using an embedded watermark that is not easily removable or detectable with respect to intermediaries such as the SSP.

The secure watermark system allows systems such as the SSP to detect invalid traffic and prevent manipulation of information regarding devices and interactions provided to the content providers. For example, an SSP can review the success rates for a particular type of interaction across content providers to determine whether a particular content provider is more prone to invalid traffic. SSPs can adjust the set of content providers from which it solicits selection criteria and candidate digital components (through, for example, exchanges) based on this data. Although the content providers are able to choose how and what is measured, the SSPs can also improve the system with the data collected.

Figure 3:
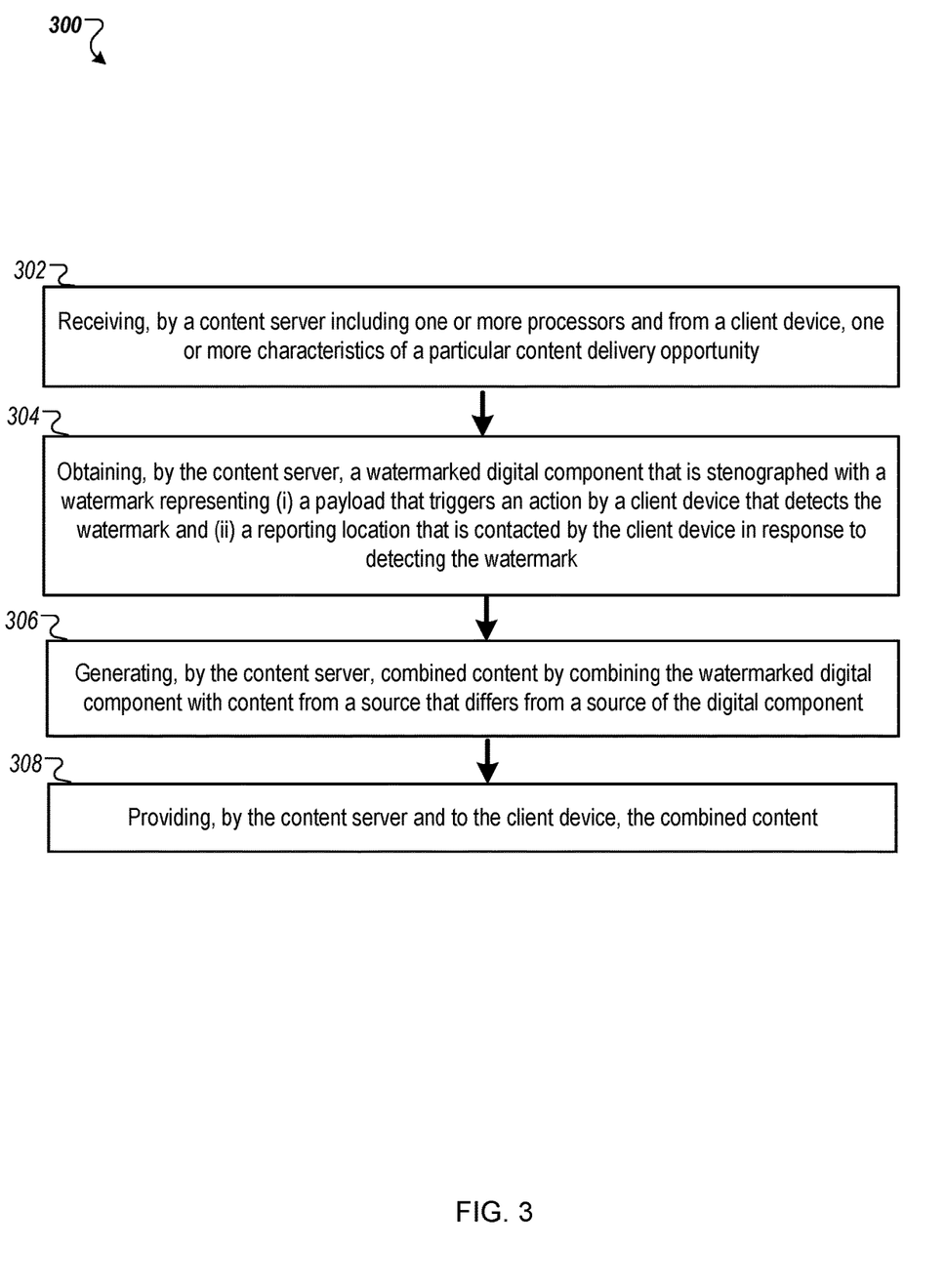
FIG. 3 is a flow diagram of an example process of integrating image watermarks into content.

FIG. 3 is a flow diagram of an example process of privacy preserving process for data collection and analysis using a space-efficient probabilistic data structure. In some implementations, process 300 can be performed by one or more systems. For example, process 300 can be implemented by DCDS 110 and/or user device(s) 106 of FIGS. 1-2. In some implementations, the process 300 can be implemented as instructions stored on a computer readable medium, which may be non-transitory, and when the instructions are executed by one or more servers, the instructions can cause the one or more servers to perform operations of the process 300.

Process 300 begins with receiving, by a content server including one or more processors and from a client device, one or more characteristics of a particular content delivery opportunity (302). For example, DCDS 110 can receive, from client device 106, a request for content from a content server, such as electronic doc server 104. In some implementations, the request includes the context in which the requested content is delivered, and the third party content provider 150 generates a watermark 122 with contextual information and embeds it into the digital component 114 so it can be provided back and that content can be provided to the user unadjusted or an intermediary, such as DCDS 110 could add other information and then provide the digital component and the content to client device 106. The application at client device 106 is configured to look for the inclusion of the watermark and/or of the information added by DCDS 110 and can take action, such as pinging a location to deliver information requested in the watermark. In some implementations, DCDS 110 can simply determine, based on information from client device 106, that particular content from electronic doc server 104 will be delivered to a user.

As described above, the content requested from a content server can be any type of data, including streaming audio or video data, image data, and text data, among other types of data. For example, the content can be an online video game that is being played on client device 106. DCDS 110 can determine, based on information from client device 106, that the streaming video game content is being requested from electronic doc server 104 and will be delivered to the user of client device 106.

Process 300 continues with obtaining, by the content server, a watermarked digital component that is stenographed with a watermark representing (i) a payload that triggers an action by a client device that detects the watermark and (ii) a reporting location that is contacted by the client device in response to detecting the watermark (302). For example, DCDS 110 can receive, from third party content provider 150, a watermarked digital component 114 that is embedded with watermarking image 122. Digital component 114 was embedded with watermarking image 122 by third party content provider 150. In this example, the watermarking image 122 represents a payload that triggers an action by client device 106 upon detection of watermarking image 122, and watermarking image 122 also represents a reporting location, such as a URL destination for third party content provider 150 that is contacted by the client device 106 in response to detecting the watermarking image 122.

In some implementations, the action can be creating a ping that is then sent to the reporting location. The reporting location can be, for example, the third party content provider, the SSP (in this example, DCDS 110), or some other specified location. In some implementations, the action can be launching a script that is already installed at the client device 106, such as a measurement script that performs a specified measurement action. In some implementations, the action can be downloading a script, or other data, from a specified location.

In some implementations, the watermarking image 122 includes a request for presentation data along with the payload. For example, the client device 106 can provide indications that the digital component was actually presented or how much of the digital component was actually presented, among other metrics.

In some implementations, the destination location is a uniform resource locator (URL) that is contacted by the client device in response to the client device detecting the watermark, and at least a portion of the payload data is transmitted to the URL in response to the client device detecting the watermark. For example, the destination location can be a URL destination that client device 106 is requested to ping in response to detecting watermarking image 122. The payload data can include, for example, a portion of data that is requested to be provided to the URL destination as proof of identity for client device 106.

In some implementations, a given portion of the payload is cryptographically signed and the given portion of the payload that is cryptographically signed is transmitted with data causing the display of the watermarked digital component to the URL. For example, the payload can be cryptographically signed by third party content provider 150 such that only third party content provider 150 can decrypt it, ensuring that any tampering is detectable by third party content provider 150, and allowing the detection of invalid responses from devices that are not client device 106, or that do not contain the payload.

In some implementations, the content server is configured to remove embedded scripts from received digital components and the watermark has a form that prevents the watermark from being removed from the watermarked digital component by the content server. For example, DCDS 110 may be configured to remove embedded scripts from digital components that it receives. Because watermarking image 122 is embedded in digital component 114 such that it is integrated with digital component 114, removing watermarking image 122 would not be possible when an SSP such as DCDS 110 is configured to deliver content without interfering with or altering the content itself.

Process 300 continues with generating, by the content server, combined content by combining the watermarked digital component with content from a source that differs from a source of the digital component (306). For example, DCDS 110 can integrate the watermarked digital component with the requested content from electronic doc server 104 before providing the content and the digital component to client device 106.

In some implementations, generating combined content comprises integrating the watermarked digital component into the content at a specified playback location within the content. For example, the requested content can be a video stream, and DCDS 110 can integrate the watermarked digital component into a particular playback location within the video.

In some implementations, the content is a video stream, and integrating the watermarked digital component into the content includes splicing the watermarked digital component into the video stream. For example, DCDS 110 can insert the watermarked digital component into the video stream such that it is joined with the video stream in the particular playback location.

In some implementations, integrating the watermarked digital component into the content includes integrating the watermarked digital component into one of: streaming audio, streaming video, gaming content or an image. As described above, DCDS 110 can insert the watermarked digital component into any type of content, including streaming audio, streaming video, gaming content or an image.

Process 300 continues with providing, by the content server and to the client device, the combined content (308). For example, DCDS 110 can provide the requested content and the watermarked digital component to client device 106.

Process 300 and the system as described with respect to FIG. 103 can be applied in any streaming environment, such as TV, movies, and online gaming, among other environments.

Figure 4:
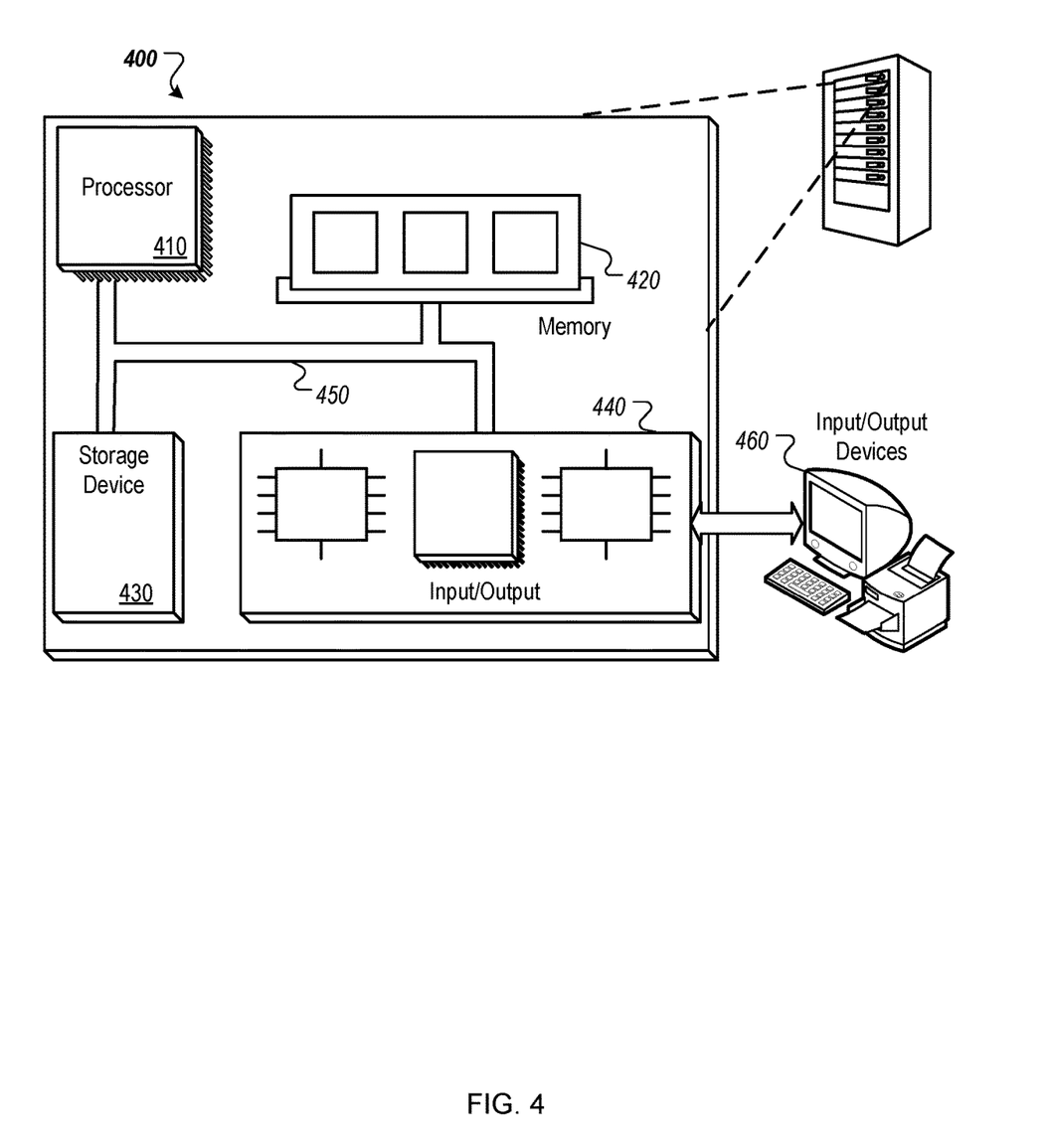
FIG. 4 is a block diagram of an example computer system.

FIG. 4 is block diagram of an example computer system 400 that can be used to perform operations described above. The system 400 includes a processor 410, a memory 420, a storage device 430, and an input/output device 440. Each of the components 410, 420, 430, and 440 can be interconnected, for example, using a system bus 450. The processor 410 is capable of processing instructions for execution within the system 400. In one implementation, the processor 410 is a single-threaded processor. In another implementation, the processor 410 is a multi-threaded processor. The processor 410 is capable of processing instructions stored in the memory 420 or on the storage device 430.

The memory 420 stores information within the system 400. In one implementation, the memory 420 is a computer-readable medium. In one implementation, the memory 420 is a volatile memory unit. In another implementation, the memory 420 is a non-volatile memory unit.

The storage device 430 is capable of providing mass storage for the system 400. In one implementation, the storage device 430 is a computer-readable medium. In various different implementations, the storage device 430 can include, for example, a hard disk device, an optical disk device, a storage device that is shared over a network by multiple computing devices (e.g., a cloud storage device), or some other large capacity storage device.

The input/output device 440 provides input/output operations for the system 400. In one implementation, the input/output device 440 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to other input/output devices, e.g., keyboard, printer and display devices 460. Other implementations, however, can also be used, such as mobile computing devices, mobile communication devices, set-top box television client devices, etc.

Although an example processing system has been described in FIG. 5, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Media does not necessarily correspond to a file. Media may be stored in a portion of a file that holds other documents, in a single file dedicated to the document in question, or in multiple coordinated files.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage media (or medium) for execution by, or to control the operation of, data processing apparatus. Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method, comprising:
receiving, by a content server including one or more processors and from a client device, one or more characteristics of a particular content delivery opportunity;
obtaining, by the content server, a watermarked digital component that is stenographed with a watermark representing (i) a payload that triggers an action by the client device that detects the watermark and (ii) a reporting location that is contacted by the client device in response to detecting the watermark, wherein the payload comprises a measurement script configured to perform a measurement action related to presentation of the watermarked digital component by the client device, wherein at least a portion of the payload is cryptographically signed, and wherein the action by the client device comprises executing the measurement script to perform the measurement action and sending measurement data of the measurement action to the reporting location;

generating, by the content server, combined content by combining the watermarked digital component with content from a source that differs from a source of the watermarked digital component; and providing, by the content server and to the client device, the combined content and data that causes the display of the watermarked digital component, wherein the portion of the payload that is cryptographically signed is transmitted to the reporting location in response to the client device detecting the watermark.

2. The method of claim 1, wherein generating combined content comprises integrating the watermarked digital component into the content at a specified location within the content.

3. The method of claim 2, wherein the content is a video stream,
wherein integrating the watermarked digital component into the content comprises splicing the watermarked digital component into the video stream at the specified location, and
wherein the specified location is a playback location.

4. The method of claim 2, wherein integrating the watermarked digital component into the content comprises integrating the watermarked digital component into one of: streaming audio, streaming video, gaming content or an image.

5. The method of claim 1, wherein:
the reporting location is a resource referenced by a uniform resource locator (URL) that is contacted by the client device in response to the client device detecting the watermark.

6. The method of claim 1, wherein:
the content server is configured to remove embedded scripts from received digital components; and
the watermark has a form that prevents the watermark from being removed from the watermarked digital component by the content server.

7. The method of claim 1, wherein the measurement data comprises a type of interaction performed by a user of the client device with the digital component.

8. A system comprising:
one or more processors; and
one or more memory elements including instructions that, when executed, cause the one or more processors to perform operations including:
receiving, by a content server including the one or more processors and from a client device, one or more characteristics of a particular content delivery opportunity;
obtaining, by the content server, a watermarked digital component that is stenographed with a watermark representing (i) a payload that triggers an action by the client device that detects the watermark and (ii) a reporting location that is contacted by the client device in response to detecting the watermark, wherein the payload comprises a measurement script configured to perform a measurement action related to presentation of the watermarked digital component by the client device, wherein at least a portion of the payload is cryptographically signed, and wherein the action by the client device comprises executing the measurement script to perform the measurement action and sending measurement data of the measurement action to the reporting location;
generating, by the content server, combined content by combining the watermarked digital component with content from a source that differs from a source of the watermarked digital component; and
providing, by the content server and to the client device, the combined content and data that causes the display of the watermarked digital component, wherein the portion of the payload that is cryptographically signed is transmitted to the reporting location in response to the client device detecting the watermark.

9. The system of claim 8, wherein generating combined content comprises integrating the watermarked digital component into the content at a specified location within the content.

10. The system of claim 9, wherein the content is a video stream,
wherein integrating the watermarked digital component into the content comprises splicing the watermarked digital component into the video stream at the specified location, and
wherein the specified location is a playback location.

11. The system of claim 9, wherein integrating the watermarked digital component into the content comprises integrating the watermarked digital component into one of: streaming audio, streaming video, gaming content or an image.

12. The system of claim 8, wherein: the reporting location is a resource referenced by a uniform resource locator (URL) that is contacted by the client device in response to the client device detecting the watermark.

13. The system of claim 8, wherein:
the content server is configured to remove embedded scripts from received digital components; and
the watermark has a form that prevents the watermark from being removed from the watermarked digital component by the content server.

14. A non-transitory computer storage medium encoded with instructions that when executed by a content server cause the content server to perform operations comprising:
receiving, by the content server including one or more processors and from a client device, one or more characteristics of a particular content delivery opportunity;
obtaining, by the content server, a watermarked digital component that is stenographed with a watermark representing (i) a payload that triggers an action by the client device that detects the watermark and (ii) a reporting location that is contacted by the client device in response to detecting the watermark, wherein the payload comprises a measurement script configured to perform a measurement action related to presentation of the watermarked digital component by the client device, wherein at least a portion of the payload is cryptographically signed, and wherein the action by the client device comprises executing the measurement script to perform the measurement action and sending measurement data of the measurement action to the reporting location;
generating, by the content server, combined content by combining the watermarked digital component with content from a source that differs from a source of the watermarked digital component; and
providing, by the content server and to the client device, the combined content and data that causes the display of the watermarked digital component, wherein the portion of the payload that is cryptographically signed is transmitted to the reporting location in response to the client device detecting the watermark.

15. The non-transitory computer storage medium of claim 14, wherein generating combined content comprises integrating the watermarked digital component into the content at a specified location within the content.

16. The non-transitory computer storage medium of claim 15, wherein the content is a video stream,
  wherein integrating the watermarked digital component into the content comprises splicing the watermarked digital component into the video stream at the specified location, and
  wherein the specified location is a playback location.

17. The non-transitory computer storage medium of claim 14, wherein:
  the reporting location is a resource referenced by a uniform resource locator (URL) that is contacted by the client device in response to the client device detecting the watermark.

\* \* \* \* \*